US012715754B2

(12) United States Patent
Kim

(10) Patent No.: US 12,715,754 B2
(45) **Date of Patent: *Aug. 25, 2026**

(54) SYSTEMS AND METHODS FOR AUTOMATIC WATER DISPENSING

(71) Applicant: YESONE CORPORATION, Whittier, CA (US)

(72) Inventor: Un Seok Kim, Tustin, CA (US)

(73) Assignee: YESONE CORPORATION, Whittier, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/284,482

(22) Filed: Jul. 29, 2025

(65) Prior Publication Data

US 2025/0353729 A1 Nov. 20, 2025

Related U.S. Application Data

(63) Continuation of application No. 18/752,550, filed on Jun. 24, 2024, now Pat. No. 12,391,536.

(60) Provisional application No. 63/524,531, filed on Jun. 30, 2023.

(51) Int. Cl.
*B67D 1/12* (2006.01)
*B67D 1/00* (2006.01)

(52) U.S. Cl.
CPC ......... *B67D 1/1243* (2013.01); *B67D 1/0014* (2013.01); *B67D 2210/0001* (2013.01); *B67D 2210/00015* (2013.01); *B67D 2210/00018* (2013.01); *B67D 2210/00023* (2013.01)

(58) Field of Classification Search
CPC ................ B67D 1/1243; B67D 1/0014; B67D 2210/0001; B67D 2210/00015; B67D 2210/00018; B67D 2210/00023
See application file for complete search history.

(56) References Cited

U.S. PATENT DOCUMENTS

| | | | | |
|---|---|---|---|---|
| 4,979,639 | A | 12/1990 | Hoover | |
| 6,517,707 | B2 * | 2/2003 | Giordano | B01D 17/0208 210/94 |
| 2001/0015211 | A1 | 8/2001 | Schuler | |
| 2001/0050248 | A1 * | 12/2001 | Larkner | C02F 1/008 210/138 |
| 2002/0158018 | A1 | 10/2002 | Abramowitz | |
| 2004/0084475 | A1 | 5/2004 | Bethuy | |

(Continued)

OTHER PUBLICATIONS

"Vacuum Break," Ozone Systems: Installation & Owner's Manual, ClearWater Tech, LLC., 1993, 3 pages.

(Continued)

*Primary Examiner* — Vishal Pancholi
(74) *Attorney, Agent, or Firm* — Womble Bond Dickinson (US) LLP

(57) ABSTRACT

A water dispensing system includes: at least one flow control valve connected to a water pipe, and comprising a flow meter configured to measure an amount of water flowing in the water pipe and a solenoid valve configured to control a flow of the water by allowing or blocking the flow of the water in the water pipe; a controller configured to control dispensing of the water from one end of the water pipe by electrically communicating with each of the flow meter and the solenoid valve; and a switch configured to provide an interface for a user to control an operation of the water dispensing system.

20 Claims, 9 Drawing Sheets

(56) References Cited

U.S. PATENT DOCUMENTS

| | | | | |
|---|---|---|---|---|
| 2006/0130481 | A1 | 6/2006 | Browe | |
| 2009/0289011 | A1 | 11/2009 | Avakian | |
| 2010/0024541 | A1 * | 2/2010 | Schindler ................ | G01M 3/26 73/199 |
| 2013/0220905 | A1 | 8/2013 | Waite | |
| 2013/0337518 | A1 | 12/2013 | Razavi-Shirazi | |
| 2015/0306341 | A1 | 10/2015 | Hoefler | |
| 2022/0024748 | A1 | 1/2022 | Fantappie | |

OTHER PUBLICATIONS

US Office Action dated Dec. 12, 2025, issued in U.S. Appl. No. 19/251,298, 14 pages.

* cited by examiner

SYSTEMS AND METHODS FOR AUTOMATIC WATER DISPENSING

CROSS-REFERENCE TO RELATED APPLICATION(S)

This application is a continuation of pending application Ser. No. 18/752,550 filed on Jun. 24, 2024, entitled "SYSTEMS AND METHODS FOR AUTOMATIC WATER DISPENSING," the entire disclosure of which is incorporated by reference herein.

Application Ser. No. 18/752,550 also claims priority to and the benefit of U.S. Provisional Application No. 63/524,531, filed on Jun. 30, 2023, entitled "SYSTEMS AND METHODS FOR AUTOMATIC WATER DISPENSING," the entire disclosure of which is incorporated by reference herein.

BACKGROUND

1. Field

Aspects of one or more embodiments of the present disclosure relate to systems and methods for water dispensing.

2. Description of Related Art

Water stores have become increasingly popular to provide various kinds of water to customers. For example, water stores may include complex water filtration equipment that is used to filter and remove contaminants and the like from tap water. Along with water filtration, water stores may include water dispensing equipment that is used to dispense the filtered water into water bottles. Typically, a human operator monitors the water dispensing equipment while water is being dispensed, so that the human operator is required to manually stop the dispensing process when the water bottles are fully filled up to prevent an overflow of water. As human operators are required to monitor the entire dispensing process to determine when to manually stop the water, the operators are not able to work on other tasks while the dispensing process is occurring. Further, because the dispensing process is manually controlled by a human operator, the amount of water being dispensed into water bottles may vary and may be inconsistent. Accordingly, improved systems and methods for water dispensing may be desired.

The above information disclosed in this Background section is for enhancement of understanding of the background of the present disclosure, and therefore, it may contain information that does not constitute prior art.

SUMMARY

One or more embodiments of the present disclosure are directed to water dispensing apparatuses, systems, and methods, and more particularly, to water dispensing apparatuses, systems, and methods for automatically dispensing various kinds of water, such as purified water, oxygenated water, and/or alkaline water, into water bottles.

According to one or more embodiments of the present disclosure, a water dispensing system includes: at least one flow control valve connected to a water pipe, and including: a flow meter configured to measure an amount of water flowing in the water pipe; and a solenoid valve configured to control a flow of the water by allowing or blocking the flow of the water in the water pipe; a controller configured to control dispensing of the water from one end of the water pipe by electrically communicating with each of the flow meter and the solenoid valve; and a switch configured to provide an interface for a user to control an operation of the water dispensing system.

In an embodiment, the flow meter may be configured to determine when a first threshold is met, and transmit a signal to the controller when the first threshold is met. The controller may be configured to transmit a first control signal to the solenoid valve in response to receiving the signal. The first threshold may be a percentage of water to be dispensed.

In an embodiment, the solenoid valve may be configured to block the flow of the water in response to receiving the first control signal by closing the solenoid valve for a duration of a threshold time.

In an embodiment, the controller may be configured to transmit a second control signal to the solenoid valve after the threshold time has lapsed, and the solenoid valve may be configured to allow the flow of the water in response to the second control signal by opening the solenoid valve.

In an embodiment, the water dispensing system may be configured to dispense water from the one end of the water pipe when the solenoid valve is opened.

In an embodiment, the interface may be configured to allow the user to configure at least one of the first threshold or the threshold time.

In an embodiment, the flow meter may be configured to transmit the signal to the controller when a second threshold is met. The controller may be configured to transmit the first control signal to the solenoid valve in response to the signal. The second threshold may be a percentage of water to be dispensed, and may be different from the first threshold.

In an embodiment, the solenoid valve may be configured to block the flow of the water in response to the first control signal by closing the solenoid valve for the duration of the threshold time. After the threshold time has lapsed, the controller may be configured to transmit the second control signal to the solenoid valve to allow the flow of the water in response to the second control signal.

In an embodiment, the water dispensing system may further include a display configured to display an amount of water that is dispensed from the water dispensing system.

According to one or more embodiments of the present disclosure, a method of dispensing water includes: injecting water into a water pipe; measuring, by a flow meter, an amount of water flowing in the water pipe; controlling, by a solenoid valve, a flow of the water by allowing or blocking the flow of the water in the water pipe; controlling, by a controller, an operation of dispensing the water by electrically communicating with each of the flow meter and the solenoid valve; providing an interface to a user to control an operation of dispensing water; and dispensing the water from one end of the water pipe.

In an embodiment, the method may further include: transmitting, by the flow meter, a signal to the controller when a first threshold is met; and transmitting, by the controller, a first control signal to the solenoid valve in response to the signal. The first threshold may be a percentage of water to be dispensed.

In an embodiment, the method may further include: blocking, by the solenoid valve, the flow of the water in response to the first control signal by closing the solenoid valve for a duration of a threshold time.

In an embodiment, the method may further include: transmitting, by the controller, a second control signal to the solenoid valve after the threshold time has lapsed; and allowing, by the solenoid valve, the flow of the water in response to the second control signal by opening the solenoid valve.

In an embodiment, when the solenoid valve is opened, the water may be dispensed from the one end of the water pipe.

In an embodiment, the method may further include: allowing, by the interface, the user to configure at least one of the first threshold or the threshold time.

In an embodiment, the method may further include: transmitting, by the flow meter, the signal to the controller when a second threshold is met; and transmitting, by the controller, the first control signal to the solenoid valve in response to the signal. The second threshold may be a percentage of water to be dispensed, and may be different from the first threshold.

In an embodiment, the method may further include: blocking, by the solenoid valve, the flow of the water in response to the first control signal by closing the solenoid valve for the duration of the threshold time; transmitting, by the controller, the second control signal to the solenoid valve after the threshold time has lapsed; and allowing, by the solenoid valve, the flow of the water in response to the second control signal by opening the solenoid valve.

In an embodiment, the method may further include: displaying, by a display, an amount of water dispensed from the water pipe.

According to one or more embodiments of the present disclosure, a water dispensing system includes: a water pipe including an inlet to receive water, and an outlet to dispense the water; at least one flow control valve configured to measure an amount of water flowing in the water pipe, and control a flow of the water in the water pipe; a controller configured to control dispensing of the water from the outlet of the water pipe by electrically communicating with the at least one flow control valve to allow or block the flow of the water in the water pipe based on at least the measured amount of water; and a switch configured to provide an interface for a user to control an operation of the water dispensing system.

In an embodiment, the switch may include a flow adjustment switch configured to adjust a flow rate of the water fed into the water dispensing system.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
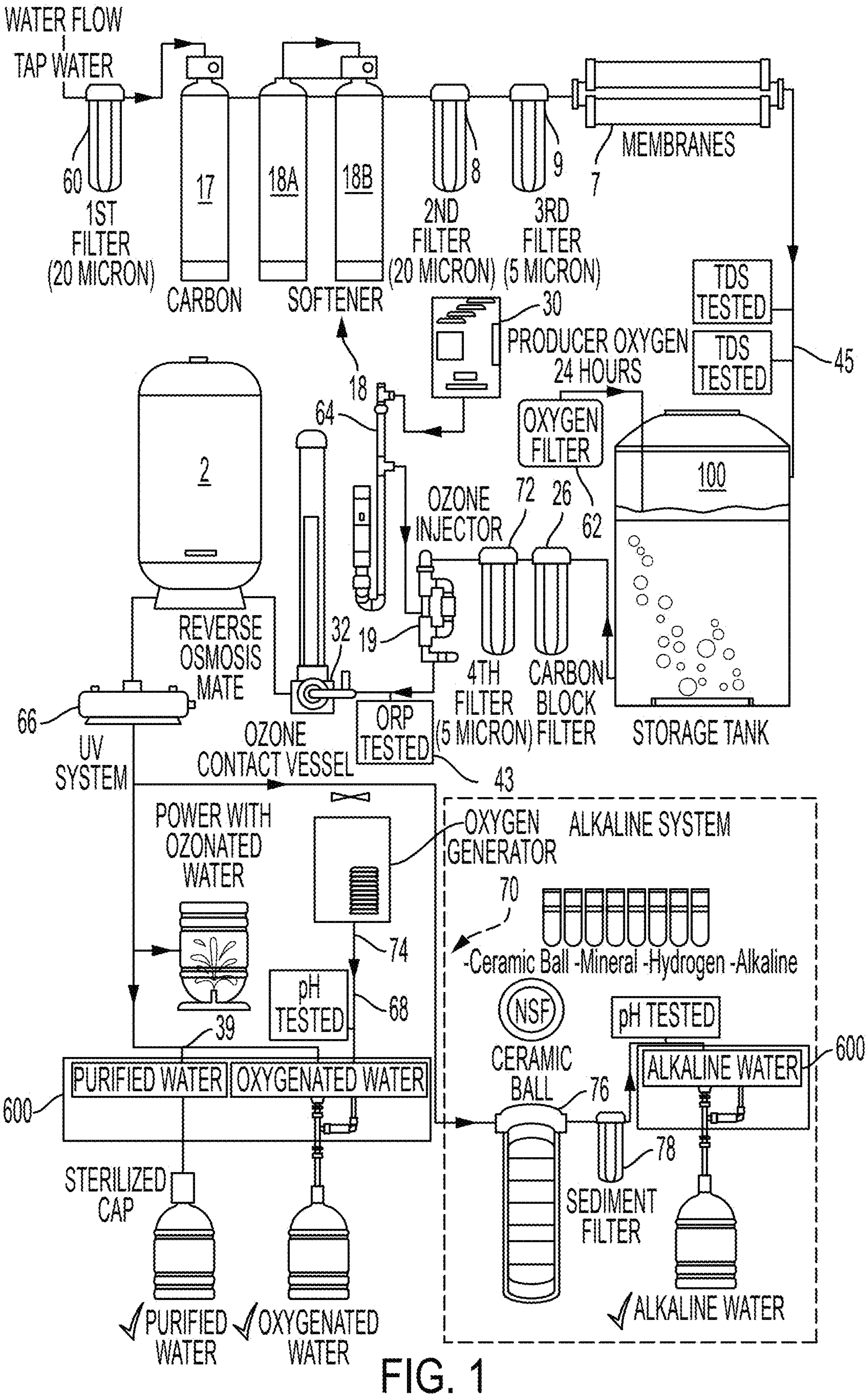
FIG. 1 is a flow diagram of a water filtration system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a flow diagram of a water filtration system according to one or more embodiments of the present disclosure. For example, the water filtration system illustrated in FIG. 1 may be used to feed various kinds of water to a water dispensing system according to one or more embodiments of the present disclosure described in more detail below.

As shown in FIG. 1, water (e.g., tap water) may be fed into the water filtration system. The fed water may be filtered through a first filter 60, which may be a 20 micron filter to remove particles from the water that are 20 microns or larger, and then through a carbon filter system 17. The filtered water may be softened through a dual softener system 18 including first and second softener tanks 18A and 18B using salt provided from a salt tank. Any rejected water from the carbon tank (that removes chlorine inside the tank) 17 and the softener tanks 18A and 18B may be exhausted through the reject water to drain connection. The soften water may be provided to a 20 micron filter 8 (which may also be referred to as a second filter), and a 5 micron filter 9 (which may also be referred to as a third filter), before being provided to an RO membrane 7 to generate product water. The product water may be tested by a TDS meter 45 to ensure a purification quality thereof (e.g., <10 PPM of total dissolved solids), and fed to a storage tank 100 via a RO product water outlet to tank connection to be stored therein for further processing as needed or desired.

Still referring to FIG. 1, the product water that is stored in the storage tank 100 may be continuously or substantially continuously aerated and circulated with air by a natural fresh air generator 62 to prevent contamination thereof, and to sustain the quality of the product water stored in the storage tank 100. Further, the storage tank 100 may include a high-level float switch and a low-level float switch therein, such that the water filtration system may be automatically controlled to generate more or less product water depending on the amount of the product water that is stored in the storage tank 100 as determined by the high-level float switch.

When it is time to further process the product water (e.g., when the customer is purchasing water, or a level of the desired water for purchasing is low), the product water may be pumped from the storage tank 100 by a repressurizing pump via the product water from storage tank to repressurizing pump connection, and may be fed to a carbon block filter 26 and a 5 micron filter (which may also be referred to as a 4$^{th}$ filter 72) for further filtering. Ozone generated by an ozone generator may be injected into the filtered water (which may also be referred to as purified water) by an ozone injector 19, and mixed with the filtered (e.g., purified) water in a contact tank 32 (e.g., an ozone contact tank) to remove bacteria from the water. The ozonated water may be stored in a pressure tank 2 (e.g., a repressurizing tank) until it is dispensed. For example, the pressure tank 2 may be an RO-Mate to safely dispense the ozonated (e.g., purified) water without contact of oxygen, such that contamination thereof may be prevented or substantially prevented.

The water stored in the pressure tank 2 is provided to an UV system 66 to remove any remaining bacteria and the like therefrom by exposing the water to UV light, and thus, the purified water may be ready to be dispensed or further processed to generate oxygenated water and/or alkaline water. For example, the purified water may be purchased by the customer, or may be further processed to generate the oxygen water and/or the alkaline water. The purified water may be dispensed as-is via the purified water to dispensers connection 39, or may be fed to an oxygen system 68 or an alkaline system 70 for further processing. Here, the purified water may be acidic/neutral, such as 6.4 or 6.5 pH.

As illustrated in FIG. 1, the oxygen system 68 may include an oxygen generator 74. The oxygen generator 74 may generate oxygen that is mixed with the purified water to generate oxygenated water. The generated oxygen may be injected into the water through an injector following Bernoulli's principle. For example, a flow rate of the oxygen generated by the oxygen generator 74 and injected into the purified water may be about 4 LPM. For example, the oxygen concentration of the oxygenated water may be about 30% to about 40%. The oxygenated water may be dispensed to a customer desiring oxygenated water.

Still referring to FIG. 1, the alkaline system 70 may include an alkaline filter 76, and a sediment filter 78. In some embodiments, the alkaline filter 76 may include a ceramic ball filter to introduce (e.g., add) various minerals into the purified water to synthesize with the minerals (e.g., to make the purified water alkaline), and the sediment filter 78 may filter out any fine particles remaining in the alkaline water. Here, because the purified water is used to generate the alkaline water, the alkaline filter 76 may be used rather than another alkaline process, for example, such as electrolysis. For example, because the purified water may be stripped of minerals, the electrolysis process may be ineffective in alkalizing the purified water. Accordingly, in some embodiments, the alkaline filter 76 including the ceramic ball may be used to generate alkaline water from the purified water. In some embodiments, the minerals introduced into the purified water by the alkaline filter 76 may include, for example, calcium (Ca), potassium (K), magnesium (Mg), zinc (Zn), and/or iron (Fe), but the present disclosure is not limited thereto. In some embodiments, the alkaline water generated by the alkaline system 70 may be basic, for example, such as 10 pH or greater. The alkaline water may be dispensed to a customer desiring alkaline water.

Accordingly, the purified water may be dispensed as-is, may be used to generate and dispense oxygenated water, and/or may be used to generate and dispense alkaline water, depending on the kind of water desired by the customer.

Figure 2A:
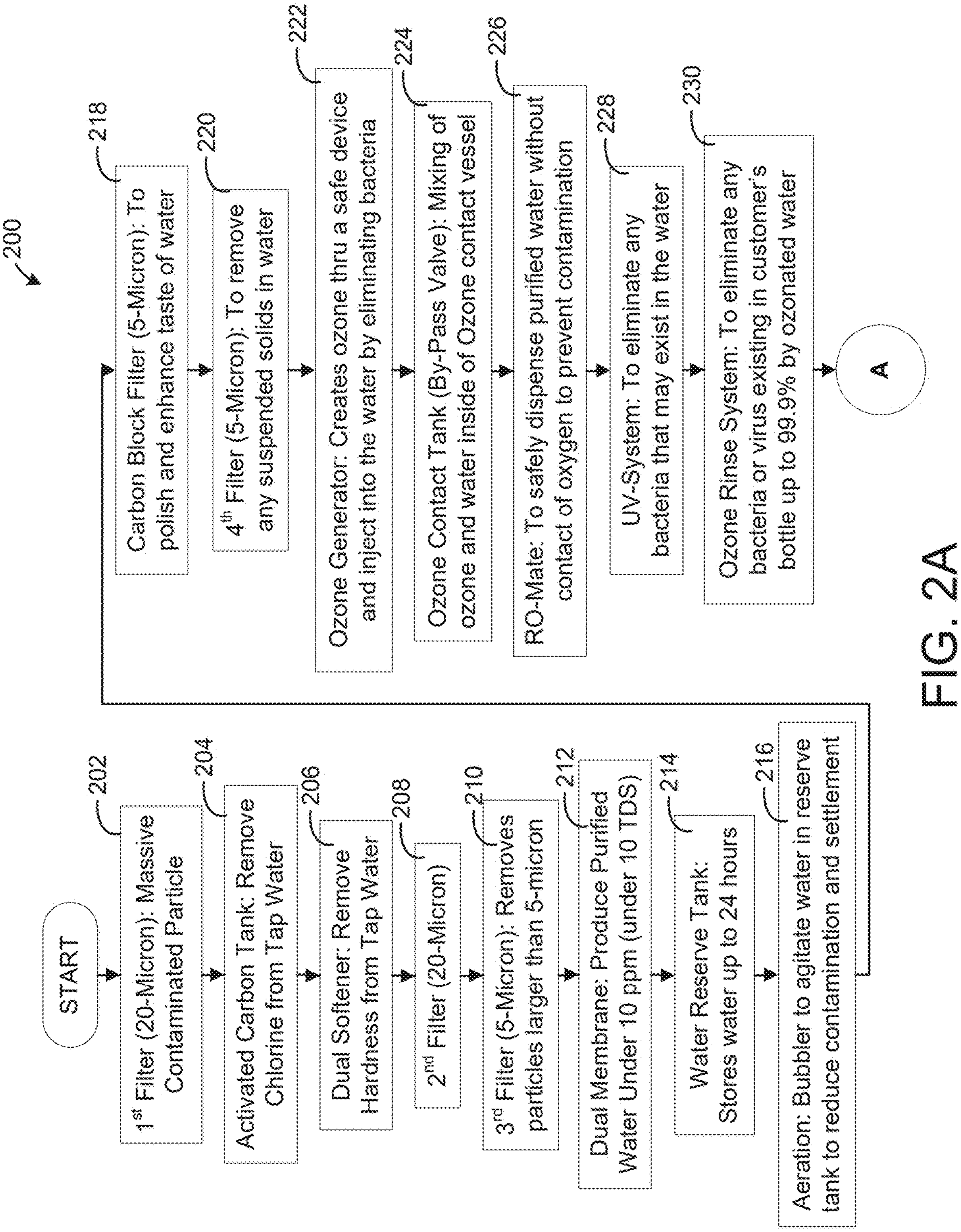
FIGS. 2A and 2B are flow diagrams of a method of generating various kinds of water.
Figure 2B:
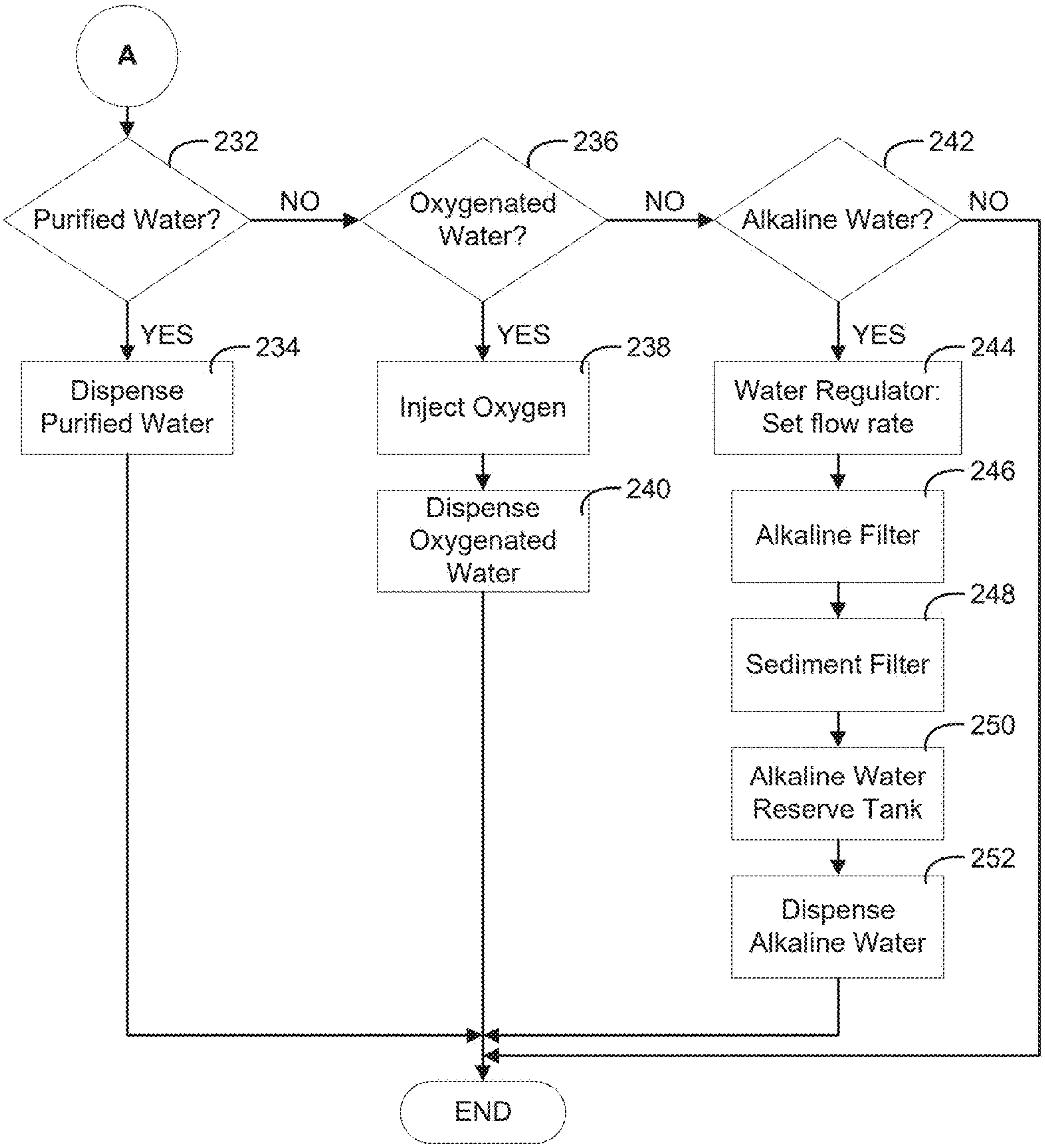

FIGS. 2A and 2B are flow diagrams of a method of generating various kinds of water. For example, method 200 illustrated in FIGS. 2A and 2B may be used to feed various kinds of water to a water dispensing system according to one or more embodiments of the present disclosure described in more detail below.

Referring to FIGS. 2A and 2B, the method 200 may start when water (e.g., tap water) is fed into the water filtration system. The water may first be filtered through a $1^{st}$ filter (e.g., a 20 micron filter) at block 202 to filter out massive contaminated particles from the water. Next, the water may be filtered through an activated carbon tank at block 204 to remove chlorine from the water. The filtered water is then softened through a dual softener system at block 206 to remove hardness from the water. The softened water is then filtered through a $2^{nd}$ filter (e.g., a 20-micron filter) at block 208, and then through a $3^{rd}$ filter (e.g., a 5-micron filter) at block 210 to remove particles from the water that are larger than 5-micron. The filtered water is then fed through a dual membrane at block 212 to produce product water (e.g., which may be purified water) under 10 ppm (e.g., under 10 TDS), and the product water is stored in a water reserve tank at block 214. For example, in some embodiments, the product water may be stored in the water reserve tank 100 for up to 24 hours. In some embodiments, the product water that is stored in the water reserve tank 100 may be aerated at block 216 by a bubbler (e.g., the natural fresh air generator 62) to agitate the water in the water reserve tank 100 to reduce contamination and settlement.

The water stored in the water reserve tank 100 may be fed to a carbon block filter (e.g., a 5 micron filter) at block 218 to polish and enhance the taste of the water. Then, the filtered water may be fed to a $4^{th}$ filter (e.g., a 5-micron filter) at block 220 to remove any suspended solids in the water, and the water output by the $4^{th}$ filter may be injected with ozone at block 222 by an ozone generator, which creates ozone through a safe device, to eliminate or reduce bacteria. The ozone injected water may be provided to an ozone contact tank (by-pass valve) at block 224 to mix the ozone and the water inside of an ozone contact vessel, and the mixed water may be stored in an RO mate at block 226 for safe dispensing without contact of oxygen to prevent contamination.

The water stored in the RO mate may be provided to a UV-system to eliminate any remaining bacteria that may exist in the water at block 228, and may be dispensed or further processed as needed or desired. For example, when a customer purchases water, the customer may provide a bottle for storing the water. In this case, the customer's bottle may be rinsed through an ozone rinse system at block 230 to eliminate any bacteria or virus existing in the customer's bottle, for example, by up to 99.9%, by ozonated water. The customer may be provided the option at block A of purchasing the purified water as-is, oxygenated water generated from the purified water, or alkaline water generated by the purified water.

In more detail, referring to FIG. 2B, from block A, the customer may be presented the option of purchasing purified water at block 232, oxygenated water at block 236, and/or alkaline water at block 242. When the customer desires to purchase the purified water (e.g., YES at block 232), the purified water may be pumped from the RO-mate, subjected to UV light through the UV-system, dispensed at block 234 into the customer's ozone-rinsed bottle, and the method 200 may end.

When the customer desires to purchase the oxygenated water (e.g., YES at block 236), the purified water may be pumped from the RO-mate, subjected to UV light through the UV-system, and injected with oxygen at block 238, for example, using an injector following Bernoulli's principle. The water injected with oxygen may be dispensed at block 240 into the customer's ozone-rinsed bottle, and the method 200 may end.

When the customer desires to purchase the alkaline water (e.g., YES at block 242), the purified water may be pumped from the RO-mate, subjected to UV light through the UV-system, and may flow into an automatic alkaline water system. The flow rate of the purified water flowing into the automatic alkaline water system may be determined by a water regulator at block 244. As discussed above, the flow rate (e.g., pressure and speed) of the water may significantly determine the pH level of the alkaline water. The water may be fed to an alkaline filter at block 246 to synthesize with minerals in the alkaline filter, and may be further filtered through a sediment filter at block 248 to filter out fine particles that may arise while passing through the alkaline filter. The alkaline water output by the sediment filter may be stored in an alkaline water reserve tank at block 250, and the alkaline water may be dispensed at block 252 into the customer's ozone-rinsed bottle, such that the method 200 may end.

Figure 3:
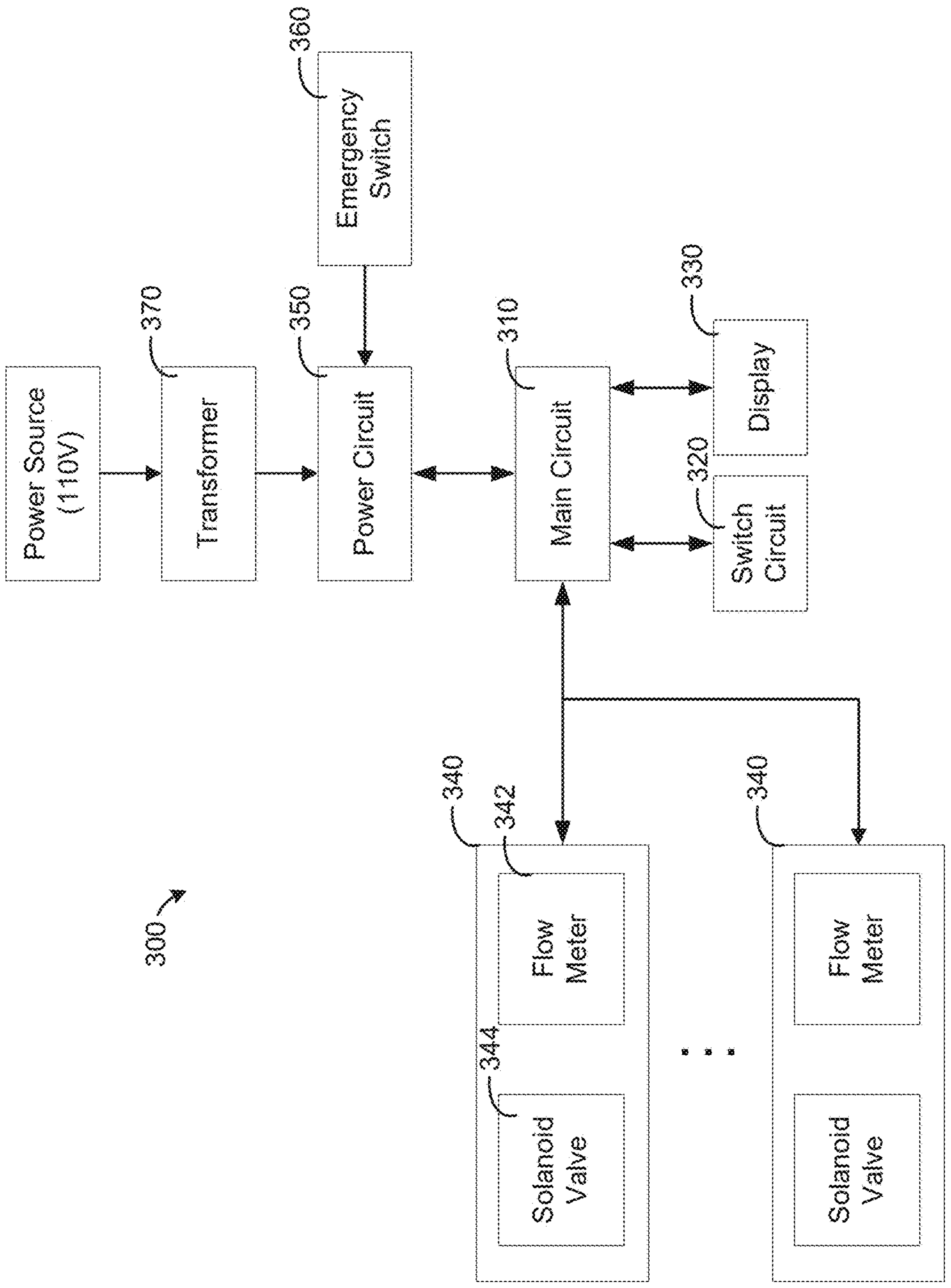
FIG. 3 is a schematic block diagram of a water dispensing system according to one or more embodiments.

FIG. 3 is a schematic block diagram of a water dispensing system according to one or more embodiments. Referring to FIG. 3, the water dispensing system 300 may include a main circuit 310, a switch circuit 320, a display 330, one or more flow control valves 340, each including a flow meter 342 and a solenoid valve 344, a power circuit 350, an emergency switch 360, a transformer 370, and a power source (e.g., 110V). The main circuit 310 is in electrical communication with the switch circuit 320, the display 330, the flow meter 342, and the solenoid valve 344. The main circuit 310 is electrically connected with the power circuit 350, which is configured to supply power to the main circuit 310. The emergency switch 360 is in electrical communication with the power circuit 350. The transformer 370 is electrically connected with the power circuit 350 and the power source. The power source supplies electricity to the transformer, which in turn, supplies electricity in an appropriate level of voltage to the power circuit 350.

The main circuit 310 may be an electrical circuit configured to control communications with the flow meter 342 and the solenoid valve 344. In an embodiment, the main circuit includes an integrated circuit that may be configured to communicate with the flower meter 342 and the solenoid valve 344 to control the operation of the flow meter 342 and the solenoid valve 344.

The switch circuit 320 may be an electrical circuit configured to provide an interface for controlling the operation of the water dispensing system 300. In an embodiment, the switch circuit 320 may include a switch panel (e.g., 400 of FIG. 4) that provides various switches for a user to control the operation of the water dispensing system 300. In an embodiment, the switch circuit 320 may include the switch panel that provides various indicators, such as LEDs (e.g., 412, 414, and 416 in FIG. 4), that show the status of the operation of the water dispensing system 300.

Figure 6:
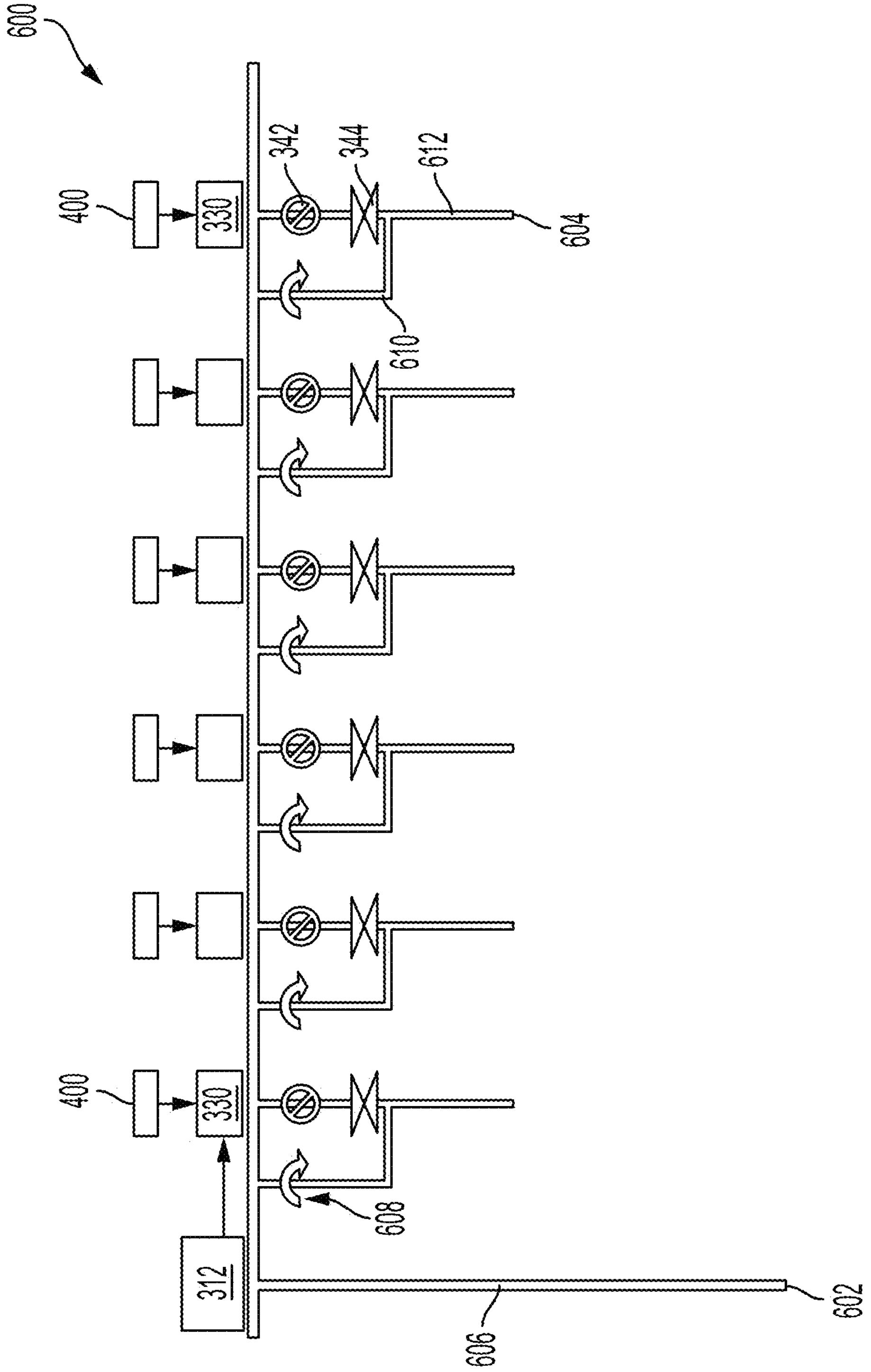
FIG. 6 shows a schematic diagram of a structure of the water dispensing system according to one or more embodiments.

The flow meter 342 is configured to measure the amount of liquid or water moving through a particular segment of a water pipe (e.g., 606 in FIG. 6). In an embodiment, the flow meter 342 may be configured to measure the flow rate of moving water at any given time, and calculate the amount of water based on the measured flow rate. In an embodiment, the flow meter 342 may be configured to measure the amount of moving water based on pounds per square inch (PSI) or gallons per minute (GMP) of a water pump that feeds water into the water dispensing system 300. It should be noted that the flow meter 342 may include any suitable kind of flow meter known to those having ordinary skill in the art that may be used in connection with the water dispensing system 300 according to one or more embodiments of the present disclosure.

The solenoid valve 344 is configured to control the flow of water dispensed by the water dispensing system 300. For example, the solenoid valve 344 is configured to either allow or block the flow of water passing therethrough or through a water pipe, upon receiving electrical signals from the main circuit 310. It should be noted that the solenoid valve 344 may include any suitable solenoid valve known to those having ordinary skill in the art that may be used in connection with the water dispensing system 300 according to one or more embodiments of the present disclosure.

The emergency switch 360 is configured to provide an interface for a user to stop the operation of the water dispensing system 300 and/or the water filtration system in case of an emergency. When the user turns on the emergency switch 350, the emergency switch transmits a signal to the power circuit 350 to turn off power, such that the water dispensing system 300 and/or the water filtration system halts operation.

In operation, a user places a water bottle (e.g., the ozone rinsed water bottle) in a designated spot (e.g., according to the desired water) below an outlet (e.g., 604 in FIG. 6). The user may select a size of the water bottle to which the desired water is dispensed by operating a switch (e.g., a water amount/size selection switch 426). For example, in an embodiment, the user may select one from among 3 gallon or 5 gallon, but the present disclosure is not limited thereto. In some embodiments, the user may select different sizes of the water bottle or different amounts of the desired water to be dispensed. Once the user selects the desired size or amount, the user may press a start button (e.g., 420 in FIG. 4) to start the process of dispensing the desired water. When the dispensing process is initiated, the desired water is supplied into an inlet (e.g., 602 in FIG. 6) of the water pipe (e.g., 606 in FIG. 6), which connects the inlet to the outlet, such that the desired water can be supplied to flow through the water pipe and dispensed into the water bottle by exiting the outlet (e.g., 604 in FIG. 6). The supplied water passes through the flow meter 342 and the solenoid valve 344 of the flow control valve 340, and is dispensed at the outlet into the water bottle. The flow meter 342 measures the amount of water passing through the water pipe, and generates a suitable signal (e.g., a first signal) to inform the main circuit 310 when the amount of water reaches a threshold. For example, if the threshold is set to be 95% of the chosen amount of water to be dispensed, the flow meter 342 generates a signal (e.g., a first signal) when the amount of water passing through the water pipe reaches 95% of the chosen amount of water. For example, if the user selected 5 gallons, then the flow meter 342 generates a signal (e.g., a first signal) when the amount of water passing through the water pipe reaches 95% of 5 gallons. In an embodiment, the user is provided with an interface (e.g., 400 in FIG. 4) to select or adjust the threshold. In some embodiments, the threshold may be indicated in different values or different base units that are not percentages. In some embodiments, the threshold may be based on the kind of the desired water and/or the flow rate thereof.

The signal (e.g., the first signal) generated by the flow meter 342 is transmitted to the main circuit 310. The main circuit 310 then transmits a control signal (e.g., a first control signal) to the solenoid valve 344 based on the signal, indicating that the solenoid valve 344 should be closed. Upon receiving the control signal from the main circuit 310, the solenoid valve 344 is closed such that no water may be further passed through the water pipe and therefore dispensed into the water bottle.

After the valve 344 is closed, the water dispensing system determines a suitable amount of time (e.g., a threshold time) to maintain the valve 344 to be in a closed state. In an embodiment, the main circuit 310 is programed (e.g., pre-programed) to maintain the valve 344 in the closed state for the suitable amount of time, such that the threshold time may be pre-determined. For example, in some embodiments, the threshold time may be set to be 2 or 3 seconds; however, any other suitable times may be set as needed or desired. In some embodiments, the threshold time may be adjusted to be either shorter or longer than 2 or 3 seconds, depending on various factors, such as (a) a type, shape, or size of the water bottle, (b) speed/flow rate of water, (c) pressure of water in the water pipe, and/or (d) a type, shape, or size of the water pipe, etc. In some embodiments, the threshold time may be automatically adjusted by the main circuit 310 based on the flow rate and the selected size of the water bottle, based on the flow rate and the desired amount of the water, or based on the flow rate and the kind of the desired water.

The threshold time may be calculated to be sufficiently long enough for bubbles in the water to settle or sink. When water is being dispensed into a water bottle, the water creates bubbles as it is being dispensed, which may make it difficult to determine the exact amount of water that has been dispensed. These bubbles may create an overflow of water in the water bottle before they settle or sink. For example, if the amount of water dispensed into the water bottle plus the additional amount of bubbles in the water exceed the capacity of the water bottle, then the dispensed water may overflow. In a related example, the additional amount of bubbles in the water is compensated for by the operator/user manually inspecting and stopping or reducing the flow of the injection of the water into the water bottle at suitable times before the water reaches the full capacity of the water bottle to avoid or reduce overflow caused by the bubbles. However, as discussed above, this manual monitoring and operation of a water dispensing system may be inefficient and inconvenient, and may prevent the operator/user from performing other tasks during the dispensing process. Further, when the dispensed water overflows, the overflowed water may be wasted, and thus, expenses due to the overflowed water may be increased.

According to one or more embodiments of the present disclosure, the water dispensing system 300 may automatically dispense water while preventing or reducing the overflow thereof, by implementing an appropriate number of thresholds (e.g., to proactively stop and restart the dispensing) for an appropriate length of time (e.g., for the bubbles to settle or sink), such that the water may be precisely and fully dispensed into any given water bottle without supervision by a human operator.

Still referring to FIG. 3, the main circuit 310 is configured to transmit a control signal (e.g., a second control signal) to the solenoid valve 344 indicating that the valve 344 should be reopened to resume dispensing of water after the threshold time has lapsed. Upon receiving the control signal from the main circuit 310, the solenoid valve 344 is opened, such that water may again be supplied through the water pipe, and therefore, further dispensed into the water bottle. The flow meter 342 continues to measure the amount of water passing through the water pipe, and generates a signal (e.g., a second signal) when the amount of water reaches a second threshold. In an embodiment, the second threshold is 98% of the selected size of the water bottle or the chosen amount of water to be dispensed. For example, if the user selects 5 gallons, the second threshold is 98% of 5 gallons. The signal is transmitted to the main circuit 310. The main circuit 310 then transmits a control signal (e.g., a third control signal) to the solenoid valve 344 to again close the valve 344. Upon receiving the control signal from the main circuit 310, the solenoid valve 344 is closed, such that no water may be further dispensed into the water bottle.

The above process may repeat a desired number of times until a desired amount of water is filled in the water bottle. After each threshold time is passed, the dispensing process is resumed in the same manner as described above. In an embodiment, there are two thresholds (e.g., first and second thresholds), and the water dispensing is stopped two times and restarted two times before finally stopping again when the entire dispensing operation is completed. However, the present disclosure is not limited thereto, and in some embodiments, there may be three or more thresholds (e.g., first, second, and third thresholds). For example, the third threshold may be set to be 99% of the selected amount of water to be dispensed. If the user selects 5 gallons, the third threshold is 99% of 5 gallons. Thus, after reaching the second threshold (e.g., 98%), the valve 344 is closed to suspend the flow of water temporarily during the threshold time. Once the threshold time is lapsed, the dispensing process is resumed again until the amount of water being dispensed reaches 99% of 5 gallon. At that moment, the third threshold (e.g., 99%) is met, and the flow meter 342 generates a signal (e.g., a third signal), which is transmitted to the main circuit 310. Upon receiving the signal from the flow meter 342, the main circuit 310 transmits a control signal (e.g., a fifth control signal) to the solenoid valve 344 indicating that the dispensing process should be suspended. Upon receiving the control signal from the main circuit 310, the solenoid valve 344 is closed, such that no water may be further dispensed into the water bottle. Upon receiving the third signal, which indicates that the third threshold (i.e., the last threshold) is met, the main circuit 310 also transmits a complete signal to the switch circuit 320. Upon receiving the complete signal from the main circuit 310, the switch circuit 320 generates a signal to indicate to the user that the water dispensing has been completed. For example, the switch circuit 320 may be configured to emit a LED or generate one or more beep sounds indicating that the water dispensing has been completed to the user, according to one or more embodiments of the present disclosure described in more detail below.

An appropriate number of thresholds and appropriate lengths of threshold times may be determined to precisely dispense water into a water bottle in a full or desired capacity while preventing or reducing overflow. For example, it may be determined that having two thresholds (e.g., 90% and 95%) and having 3 seconds threshold time are suitable to dispense water into a 3 gallon water bottle in full or near full capacity while preventing or reducing overflow, while having three thresholds (e.g., 90%, 95%, and 99%) and having 4 seconds threshold time are suitable to dispense water into a 5 gallon water bottle in full or near full capacity while preventing or reducing overflow. In an embodiment, the user may be provided with an interface to directly set up the appropriate number of thresholds and the appropriate length of threshold time (e.g., type in or select these values). In another embodiment, these values may be pre-programed into one or more components of the main circuit 310.

Figure 4:
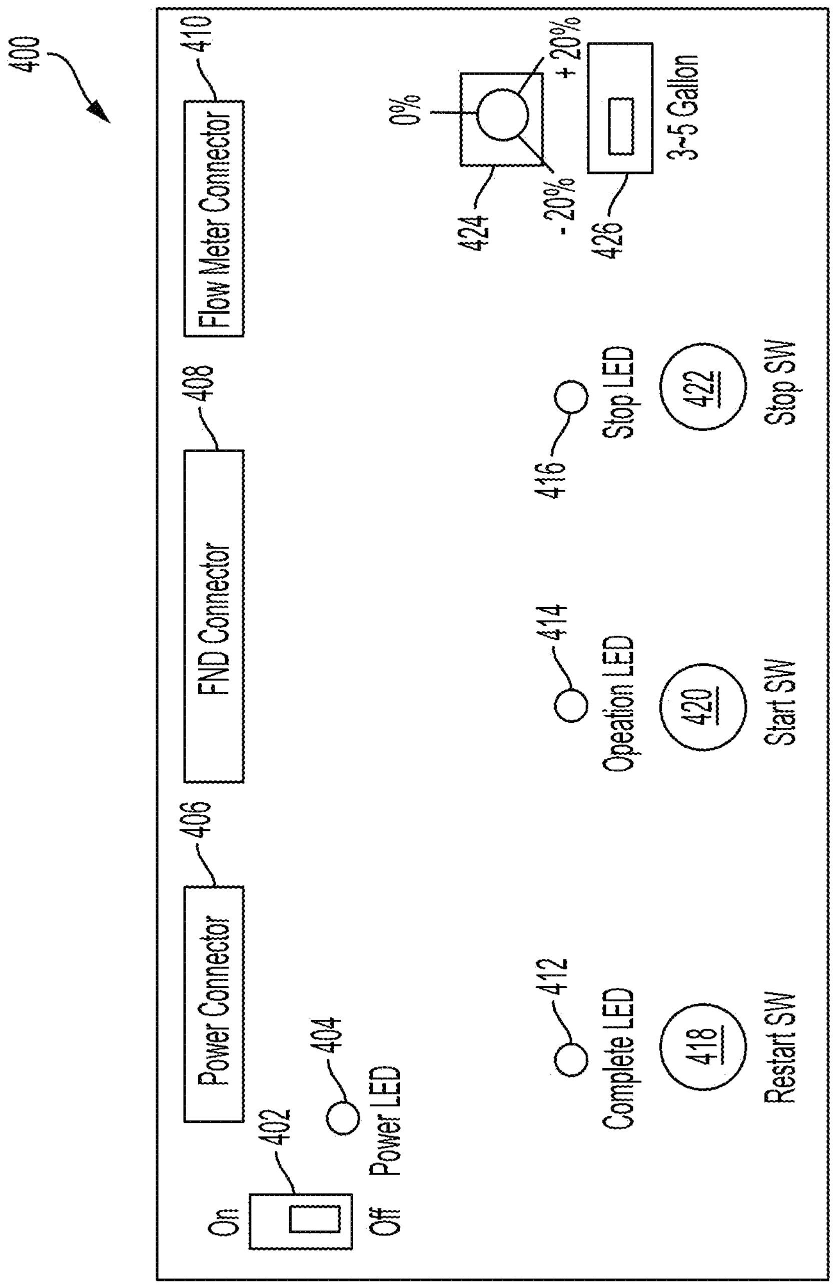
FIG. 4 is a schematic diagram of an interface for a switch circuit.

FIG. 4 is a schematic diagram of an interface for the switch circuit 320. As shown in FIG. 4, the interface for the switch circuit 320 includes a power switch 402, a power LED 404, a power connector 406, a FND connector 408, a flow meter connector 410, a complete LED 412, an operation LED 414, a stop LED 416, a restart switch 418, a start switch 420, a stop switch 422, a flow adjustment switch 424, and a water-amount/size selection switch 426.

The power switch 402 may be turned on to turn on power to operate the water dispensing system, or may be turned off to halt the operation of the water dispensing system. The power LED 404 indicates the status of power. For example, when power is turned on, the power LED 404 is emitted to indicate that power is on. The complete LED 412, the operation LED 414, and the stop LED 416 indicate the status of the dispensing process. For example, if the dispensing process is completed, i.e., the water bottle is fully filled up with water, then the complete LED 412 is emitted. In an embodiment, the switch circuit 320 may be configured to generate one or more beep sounds to alert the user that the dispensing process is completed. If the dispensing process is ongoing, the operation LED 414 is emitted to indicate that the system is currently dispensing water. If the dispensing process is stopped or suspended, the stop LED 416 is emitted to indicate that the system is currently not operating.

In the embodiment shown in FIG. 4, the LED indicators (e.g., 412, 414, and 416) are shown as round shape LEDs; however, any other suitable shapes or types of LEDs may be used in connection with the switch circuit 320. Likewise, other connectors and switches shown in FIG. 4 are provided as examples, and any other suitable connectors or switches may be used in connection with the switch circuit 320.

The restart switch 418 may be used to resume dispensing of water after the dispensing process had been stopped or suspended. The start switch 420 may be used to start the operation of the water dispensing system. The stop switch 422 may be used to stop or suspend water dispensing.

The power connector 406 is configured to be electrically connected to the power circuit 350. The FND connector 408 is configured to be electrically connected to the display 330. The flow meter connector 410 is configured to be electrically connected to a flow meter (e.g., 342). In an embodiment, any or all of the power connector 406, the FND connector 408, and the flow meter connector 410 may be configured to reside on the main circuit 310 or other components/devices of the water dispensing system.

The flow adjustment switch 424 is configured to adjust the flow rate/speed of water being fed into the water dispensing system. For example, by adjusting the switch 424, the user may adjust the flow rate/speed of water being fed into the system by −20% to +20%, increment by 1%. In an embodiment, the switch 424 is a knob switch. In some embodiments, the switch 424 may be configured to provide an input interface which can be used to directly type in or select any desired number by the user that represents a certain flow rate/speed of water.

Figure 5:
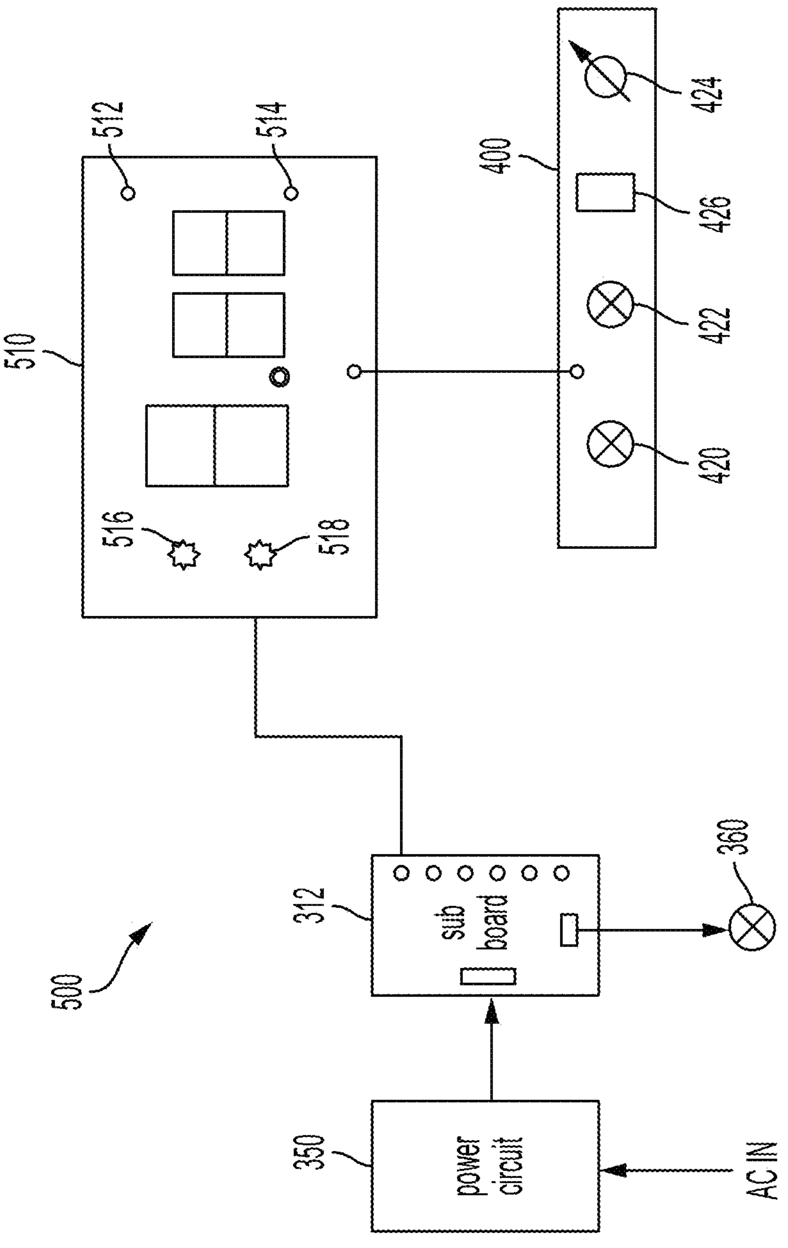
FIG. 5 is a schematic diagram of a display connected with the switch circuit.

FIG. 5 is a schematic diagram of the display 330 connected with the switch circuit 320. Referring to FIG. 5, the display 330 includes a display control board 510. The display control board 510 includes a solenoid valve LED 512, a flow meter LED 514, an operation LED 516, and a complete LED 518. The solenoid valve LED 512 indicates the operational status of the solenoid valve 344. For example, when the solenoid valve 344 is properly functioning or operating, the solenoid valve LED 512 is emitted. The flow meter LED 514 indicates the operational status of the flow meter 342. For example, when the flow meter 342 is properly functioning or operating, the flow meter LED 514 is emitted. The operation LED 516 and the complete LED 518 indicate the status of the dispensing process. For example, when the water is being dispensed to the water bottle, the operation LED 516 is emitted. When the dispensing process is completed, then the operation LED 516 is turned off and the complete LED 518 is emitted instead.

The display control board 510 is also configured to display the amount of water currently dispensed into the water bottle in a numeric format. For example, if 2.5 gallons of water is currently dispensed, the display control board 510 displays "2.50" in the display 500, so that the user can see how much water has been currently dispensed. In an embodiment, the flow meter 342 and/or the main circuit 310 may be configured to provide such information in real time or near real time to be displayed in the display 500.

The display control board 510 may be configured to be electronically connected with the power circuit 350, the sub board 312, and the switch board 400. The sub board 312 may be configured to be part of the main circuit 310. The sub board 312 is electrically connected to the emergency switch 360. The sub board provides an interface between the power circuit 350 and the main circuit 310, and an interface between the display 500 and the main circuit 310.

The switch board 400 may include the start switch 420, the stop switch 422, the water-amount selection switch 426, and the flow adjustment switch 424. These switches operate in the same manner as described above with respect to FIG. 3. However, the present disclosure is not limited to the switches and other components illustrated in FIG. 5.

FIG. 6 shows a schematic diagram of a structure of the water dispensing system 600 according to one or more embodiments. Referring to FIG. 6, six outlets 604 may be connected to the water pipe 606, but the present disclosure is not limited to the number of outlets 604 illustrated in FIG. 6. Each outlet 604 is located at a corresponding distal end of sub-branches 612 of the water pipe 606 connected to the flow control valves 340 where the flow meter 342 and the solenoid valve 344 are located. Each flow meter 342 is configured to measure the amount of water fed into the corresponding outlet 604. Each solenoid valve 344 is configured to suspend the flow of water or resume the flow of water in the corresponding sub-branch 612 of the water pipe 606 in the same manner as described above with respect to FIG. 3.

In FIG. 6, the user may place and dispense up to six water bottles at the same time, as there are six outlets 604 available in the water dispensing system 600. In some embodiments, any other suitable number of outlets may be included. For example, there may be 3 outlets or 4 outlets, each providing an outlet for dispensing water into a water bottle. In some embodiments, the user may dispense water into one or more water bottles of different sizes. For example, the user may use a 3-gallon water bottle to dispense water from a first outlet 604 and use a 5-gallon water bottle to dispense water from a second outlet 604. The user may operate the water amount/size selection switch 426 to select a suitable size of the water bottle in which the water is to be dispensed.

Still referring to FIG. 6, the sub board 312 is electrically connected with the display 330. The display 330 is electrically connected with the switch board 400. The sub board 312, the display 330, and the switch board 400 are configured and operate in the same manner as described above with respect to FIGS. 3 to 5. In FIG. 6, a manual lever 608 is located on each of secondary pipes 610. One end of the secondary pipe 610 is connected with the main branch of the water pipe 606, and the other end of the secondary pipe 610 is connected with the sub-branch 612 of the water pipe 606 that leads to the outlet 604, as shown in FIG. 6. FIG. 6 illustrates six secondary pipes 610, but the present disclosure is not limited thereto. The manual lever 608 may be used to control the flow of water at each outlet manually. For example, if the water dispensing system is malfunctioning, and thus, the dispensing process cannot be automatically controlled, the user may use the manual lever 608 to manually allow or suspend the flow of water in the corresponding outlet 604.

Figure 7:
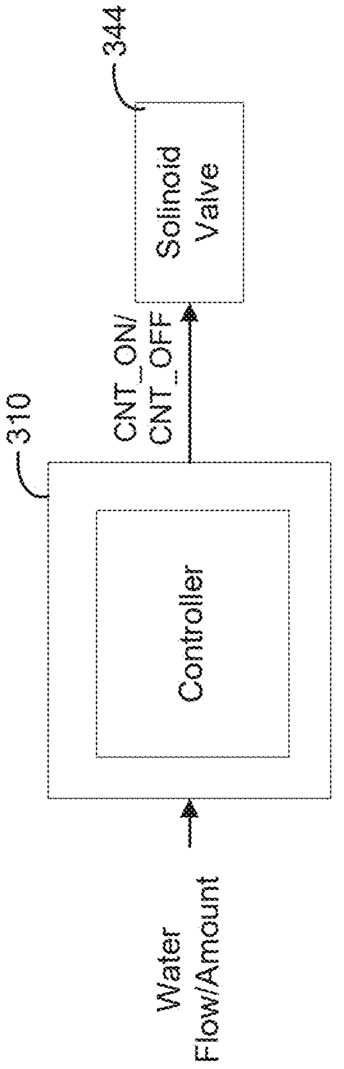
FIG. 7 is a schematic block diagram of a main circuit according to one or more embodiments.

FIG. 7 is a schematic block diagram of the main circuit 310 according to one or more embodiments. The main circuit 310 includes a controller that is configured to receive signals from the flow meter 342, and transmit signals to the solenoid valve 344. For example, when the flow meter 342 detects that the threshold is met (e.g., the first threshold), the flow meter 342 transmits a signal (e.g., the first signal) to the controller indicating that the amount of water dispensed into a water bottle reached the threshold. Upon receiving such a signal, the controller transmits a control signal (e.g., the first control signal) to the solenoid valve 344 indicating that the valve should be closed. The solenoid valve 344 is then closed and water dispensing is suspended. In an embodiment, the controller may be an integrated circuit. In this case, the integrated circuit may be programed to set up the threshold (e.g., the first and second thresholds). In an embodiment, the integrated circuit may be programed to set up the threshold time (e.g., 2 or 3 seconds) during which water dispensing is suspended. In an embodiment, the integrated circuit may be programed to set up a number of thresholds (e.g., 3 times) that must be met in a sequential order, to complete the water dispensing process. For example, if the number is set to be 3, the water dispensing system repeats the process of suspending water dispensing when each threshold is met, and resuming water dispensing after the threshold time is passed for all three thresholds. The number of thresholds to be used in the water dispensing system may be determined, depending on various factors, such as (a) a type, shape, or size of the water bottle, (b) speed/flow rate of water, (c) pressure of water in the water pipe, and/or (d) a type, shape or size of the water pipe, etc. In some embodiments, the number of thresholds may be automatically determined or adjusted by the main circuit 310 based on one or more of these factors.

Figure 8:
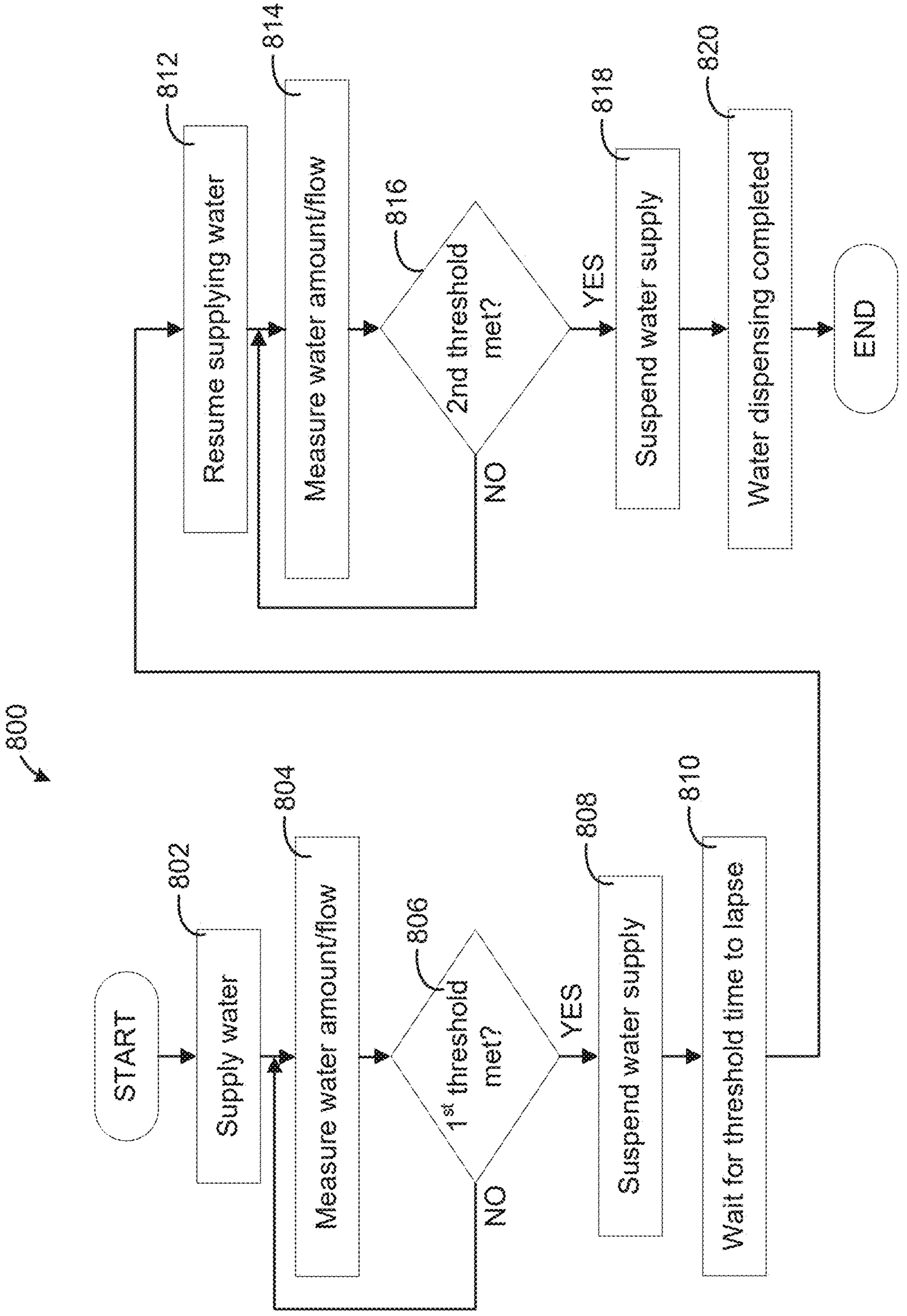
FIG. 8 is a flow diagram of a method for dispensing water according to one or more embodiments.

FIG. 8 is a flow diagram of a method for dispensing water according to one or more embodiments. However, the present disclosure is not limited to the sequence or number of the operations of the method 800 shown in FIG. 8, and can be altered into any desired sequence or number of operations as recognized by a person having ordinary skill in the art. For example, in some embodiments, the order may vary, some processes thereof may be performed concurrently or sequentially, or the method 800 may include fewer or additional operations.

Referring to FIG. 8, the method 800 may start when water is supplied into the inlet 602 of the water dispensing system at block 802. The user may place a water bottle underneath the outlet 604 in a designated spot, and may press the start switch 420 to initiate block 802. Once water starts to be supplied and passes through the water pipe 606 into the water bottle, the flow meter 342 measures the amount of water dispensed into the water bottle at block 804. If the amount of dispensed water reaches the first threshold (e.g., 95%), then the flow meter transmits a signal (e.g., a first signal) indicating that the first threshold is met to the main controller 310 at block 806. As described above with respect to FIG. 7, the first threshold may be programed into the controller of the main circuit 310. The main circuit 310 then transmits a control signal (e.g., a first control signal) to the solenoid valve 344 to close the valve 344, and thus, water dispensing is suspended at block 808. The solenoid valve 344 is closed so that the flow of water through the outlet 604 is blocked at block 808.

Next, the main circuit 310 may be programed to run a clock until the threshold time is lapsed (e.g., 3 seconds) at block 810. As described above with respect to FIG. 7, the main circuit 310 may be configured to be programed to set up the threshold time. After the threshold time is lapsed, the main circuit 310 transmits a control signal (e.g., a second control signal) to the solenoid valve 344 to resume dispensing of water at block 812. Upon receiving the control signal, the solenoid valve 344 is opened to allow flow of water into the outlet 604. The flow meter 342 continues to measure the amount of water dispensed into the water bottle at block 814. If the amount of dispensed water reaches the second threshold (e.g., 99%), then the flow meter 342 transmits a signal (e.g., a second signal) indicating that the second threshold is met to the main circuit 310 at block 816. Like the first threshold, the second threshold may be programmed into the controller of the main circuit 310. The main circuit 310 then transmits a control signal (e.g., a third control signal) to the solenoid valve 344 to suspend dispensing of water at block 818. The solenoid valve 344 is closed to not allow flow of water through the outlet at block 818. In the present embodiment, the main circuit 310 is programmed to have two thresholds, and therefore, the water dispensing system is configured to complete the dispensing process after the second threshold is met. Water dispensing is completed at block 820, and the method 800 ends. For example, upon receiving the second signal from the flow meter 342, the main circuit 310 transmits a complete signal to the switch circuit 320. The switch circuit 320 then generates a signal to indicate that the water dispensing is completed. In an embodiment, the main circuit may be programmed to have a different number of thresholds, and depending on the programmed number, the same process (e.g., blocks 802 to block 810) may be repeated until a final threshold is met.

In an embodiment, the user is provided with an option to choose a type of water to be dispensed. For example, the user is provided with an interface which may be used to select purified water, oxygenated water, or alkaline water. Based on the user's selection, a type of water that flows into the inlet 602 is determined. In an embodiment, the dispensers connection 39 may be configured to be adjustably and removably connected to the inlet 602 of the water pipe. For example, if the user selects purified water, then the dispensers connection 39 for the purified water is removably connected to the inlet 602 such that the purified water may be supplied to the water pipe 606 for dispensing. In some embodiments, each sub-branch 612 of the water pipe 606 may be configured to directly receive the dispensers connection 39. For example, the first sub-branch 612 of the water pipe 606 may be connected with the dispensers connection 39 for purified water while the second sub-branch 612 of the water pipe 606 may be connected with the dispensers connection 39 for oxygenated water. In this embodiment, the user is able to dispense both purified water and oxygenated water at the same time.

The electronic or electric devices and/or any other relevant devices or components according to embodiments of the present disclosure described herein (e.g., the circuits, controllers, and/or the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A water dispensing system, comprising:

a water pipe;

at least one flow control valve connected to the water pipe, the flow control valve configured to
measure an amount of water flowing in the water pipe, and
determine when each of a plurality of thresholds is met; and
a controller configured to control dispensing of the water from one end of the water pipe by electrically communicating with the at least one flow control valve to allow or block a flow of the water in the water pipe,
wherein each of the plurality of thresholds represents a different amount of water to be dispensed, and
wherein the controller is configured to suspend the dispensing of the water by causing the flow control valve to block the flow of the water in the water pipe when each of the plurality of thresholds is met.

2. The system of claim 1, wherein each of the plurality of thresholds represents an amount of water less than a volume of a container to which the water is dispensed.

3. The system of claim 2, wherein each of the plurality of thresholds is a percentage of the volume of the container.

4. The system of claim 1, wherein the dispensing of the water is suspended for a duration of a threshold time when each of the plurality of thresholds is met.

5. The system of claim 4, wherein the controller is configured to resume the dispensing of the water by causing the flow control valve to allow the flow of the water in the water pipe after the threshold time has lapsed.

6. The system of claim 4, wherein the controller is configured to be programmed to set up at least one of the threshold time or one of the plurality of thresholds.

7. The system of claim 4, further comprising a switch configured to provide an interface to allow a user to configure at least one of the threshold time or one of the plurality of thresholds.

8. The system of claim 1, wherein the plurality of thresholds comprise a first threshold and a second threshold, the first threshold representing an amount of water less than an amount of water being represented by the second threshold.

9. A method of dispensing water, the method comprising:
injecting water into a water pipe;
measuring, by a flow control valve, an amount of water flowing in the water pipe;
determining, by the flow control valve, when each of a plurality of thresholds is met; and
controlling, by a controller, an operation of dispensing the water from one end of the water pipe by electrically communicating with the flow control valve to allow or block a flow of the water in the water pipe,
wherein each of the plurality of thresholds represents a different amount of water to be dispensed, and
wherein the operation of dispensing the water is suspended by blocking the flow of the water in the water pipe when each of the plurality of thresholds is met.

10. The method of claim 9, wherein each of the plurality of thresholds represents an amount of water less than a volume of a container to which the water is dispensed.

11. The method of claim 10, wherein each of the plurality of thresholds is a percentage of the volume of the container.

12. The method of claim 9, wherein the operation of dispensing of the water is suspended for a duration of a threshold time when each of the plurality of thresholds is met.

13. The method of claim 12, further comprising:
resuming, by the controller, the operation of dispensing the water by allowing the flow of the water in the water pipe after the threshold time has lapsed.

14. The method of claim 12, further comprising:
programming the controller to set up at least one of the threshold time or one of the plurality of thresholds.

15. The method of claim 12, further comprising:
allowing, by an interface, a user to configure at least one of the threshold time or one of the plurality of thresholds.

16. The method of claim 9, wherein the plurality of thresholds comprise a first threshold and a second threshold, the first threshold representing an amount of water less than an amount of water being represented by the second threshold.

17. A water dispensing system, comprising:
a water pipe;
at least one flow control valve connected to the water pipe, the flow control valve configured to
measure an amount of water flowing in the water pipe, and
determine when a first threshold is met; and
a controller configured to control dispensing of the water from one end of the water pipe by electrically communicating with the at least one flow control valve to allow or block a flow of the water in the water pipe,
wherein a first threshold represents an amount of water to be dispensed, and
wherein the controller is configured to suspend the dispensing of the water for a duration of a threshold time by causing the flow control valve to block the flow of the water in the water pipe when the first threshold is met.

18. The system of claim 17, wherein the flow control valve is configured to determine when a second threshold is met, and the controller is configured to suspend the dispensing of the water for the duration of the threshold time by causing the flow control valve to block the flow of the water in the water pipe when the second threshold is met.

19. The system of claim 18, wherein the flow control valve is configured to determine when a third threshold is met, and the controller is configured to suspend the dispensing of the water for the duration of the threshold time by causing the flow control valve to block the flow of the water in the water pipe when the third threshold is met.

20. The system of claim 19, wherein the controller is configured to resume the dispensing of the water by causing the flow control valve to allow the flow of the water in the water pipe after the threshold time has lapsed.

* * * * *